(12) United States Patent
Atsumo

(10) Patent No.: US 12,482,260 B2
(45) Date of Patent: Nov. 25, 2025

(54) DRIVE RECORDER OPERATION SYSTEM

(71) Applicant: JVCKENWOOD Corporation, Yokohama (JP)

(72) Inventor: Norio Atsumo, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 433 days.

(21) Appl. No.: 18/082,614

(22) Filed: Dec. 16, 2022

(65) Prior Publication Data

US 2023/0120235 A1 Apr. 20, 2023

Related U.S. Application Data

(63) Continuation of application No. PCT/JP2021/017824, filed on May 11, 2021.

(30) Foreign Application Priority Data

Jun. 23, 2020 (JP) .................. 2020-108185
Jun. 23, 2020 (JP) .................. 2020-108190

(51) Int. Cl.
*G06V 20/40* (2022.01)
*G06F 16/71* (2019.01)
*G06F 16/783* (2019.01)

(52) U.S. Cl.
CPC .............. *G06V 20/44* (2022.01); *G06F 16/71* (2019.01); *G06F 16/783* (2019.01)

(58) Field of Classification Search
CPC ........ G06V 20/44; G06V 20/56; G06F 16/71; G06F 16/783; G07C 5/00; H04N 23/60

(Continued)

(56) References Cited

U.S. PATENT DOCUMENTS 11,040,712 B2 * 6/2021 Furukawa ............. B60W 50/14
11,348,379 B2 * 5/2022 Tsukahara ............. G06V 20/56
(Continued)

FOREIGN PATENT DOCUMENTS

| JP | 2018-055352 | | 4/2018 | |
| JP | 2020-95596 | | 6/2020 | |
| JP | 2020095596 | * | 6/2020 | ............. G06F 16/00 |

OTHER PUBLICATIONS

International Search Report and Written Opinion for International Application No. PCT/JP2021/017824 mailed on Jul. 13, 2021, 8 pages.

*Primary Examiner* — Lin Ye
*Assistant Examiner* — Chan T Nguyen
(74) *Attorney, Agent, or Firm* — Amin, Turocy & Watson, LLP

(57) ABSTRACT

A drive recorder operation system includes: a sensor unit configured to send index information containing information about an event which occurred in a vehicle; a drive recorder configured to generate a video file by capturing a video of surrounding of the vehicle, and store the video file in a memory medium; and a linking device configured to link the event to the stored video file based on the index information sent from the sensor unit, wherein the linking device includes: a server configured to transfer the index information from the sensor unit; and a terminal device configured to read the video file from the memory medium, clip video data for a predetermined period of time including a date and time of the event based on the index information transferred from the server, and send the clipped video data to the server.

6 Claims, 9 Drawing Sheets

(58) Field of Classification Search
USPC .................................................... 348/231.2
See application file for complete search history.

(56) References Cited

U.S. PATENT DOCUMENTS

| | | | |
|---|---|---|---|
| 2013/0006674 A1* | 1/2013 | Bowne | G06Q 10/0833 705/4 |
| 2019/0188930 A1* | 6/2019 | Tsukahara | G07C 5/00 |
| 2019/0228228 A1* | 7/2019 | Tsukahara | G06V 20/41 |
| 2020/0043260 A1* | 2/2020 | Yamada | G07C 5/00 |
| 2020/0184226 A1* | 6/2020 | Zhu | H04N 5/91 |
| 2022/0020270 A1* | 1/2022 | Ogata | G08G 1/04 |
| 2022/0254199 A1 | 8/2022 | Tsukahara | |

* cited by examiner

| SENSOR UNIT IDENTIFICATION INFORMATION | INDEX INFORMATION | | |
|---|---|---|---|
| | LOCATION (LATITUDE, LONGITUDE) | DATE (MONTH, DAY, YEAR) | TIME (HOUR, MINUTE, SECOND) |
| **** | LN101, LE101 | M101, D101, Y101 | H101, M101, S101 |

DRIVE RECORDER OPERATION SYSTEM

CROSS-REFERENCE TO RELATED APPLICATIONS

This application is a Continuation of PCT International Application No. PCT/JP2021/017824 filed on May 11, 2021 which claims the benefit of priority from Japanese Patent Applications No. 2020-108185 and No. 2020-108190, both filed on Jun. 23, 2020, the entire contents of all of which are incorporated herein by reference.

FIELD

The present invention relates to a drive recorder operation system.

BACKGROUND

A drive recorder which is a so-called dashcam and installed in a vehicle captures a video of surrounding of the vehicle, such as a front side of the vehicle, in a temporally continuous manner, and stores the captured video in a storage. For example, a drive recorder is known that has a function for sending data detected by a sensor, such as an acceleration sensor, and a video as data indicating the driving situation (for example, Japanese Laid-open Patent Application No. 2018-055352).

Among standalone drive recorders that are not equipped with a communication function, there is a drive recorder in which an event such as an impact shock detected by an acceleration sensor is synchronized with the captured video, and the synchronized data is stored in an external storage such as an SD card. As a result, for example, it becomes possible to identify and clip the video data at a date and time of the impact shock due to an accident to the vehicle. However, if a sensor such as an acceleration sensor is not installed, the video data of the captured video cannot be linked to event information such as the date and time of the impact shock. For that reason, it becomes necessary to have a means for identifying and clipping the video data corresponding to the date and time of the impact shock.

A drive recorder operation system is disclosed.

SUMMARY

According to one aspect, there is provided a drive recorder operation system comprising: a sensor unit configured to send index information containing information about an event which occurred in a vehicle; a drive recorder configured to generate a video file by capturing a video of surrounding of the vehicle in a temporally continuous manner to store the video file in a memory medium; and a linking device configured to link the event which occurred in the vehicle to the video file stored in the memory medium based on the index information sent from the sensor unit, wherein the linking device includes: a server configured to transfer the index information sent from the sensor unit; and a terminal device configured to read the video file from the memory medium, clip video data for a predetermined period of time including a date and time of the event occurred based on the index information transferred from the server, and send the clipped video data to the server.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Figure 1:
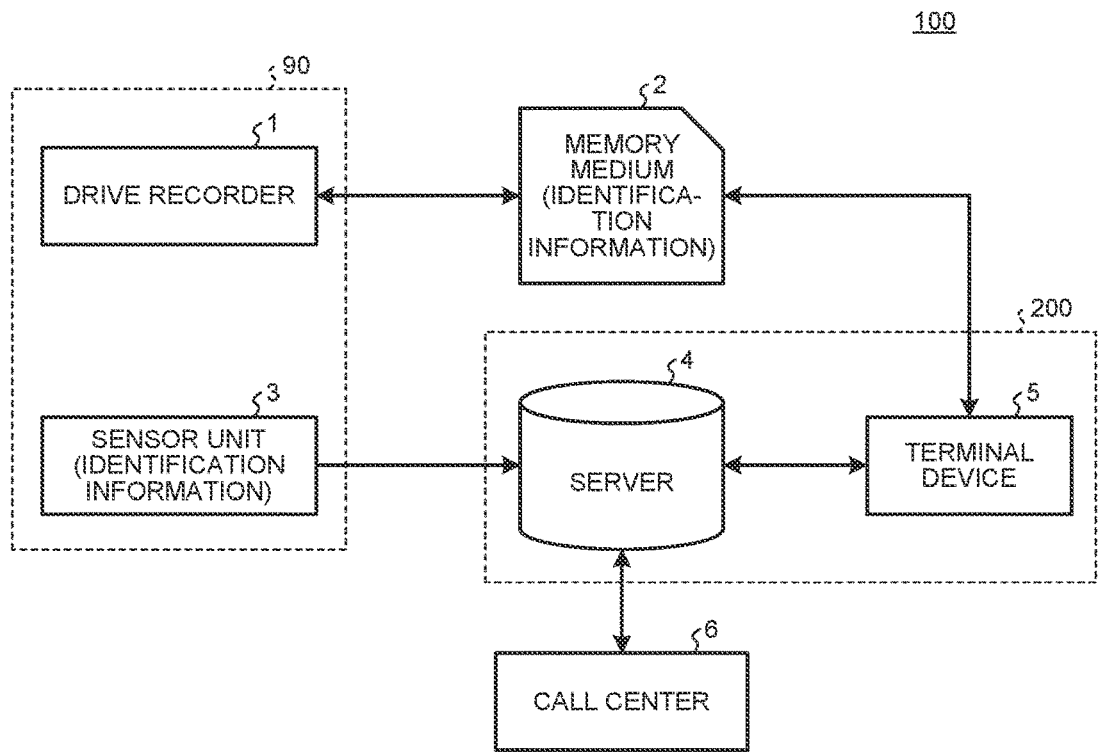
FIG. 1 is a conceptual diagram for explaining a configuration of a drive recorder operation system according to the present application.

Exemplary embodiments of the present application are described below in detail with reference to the accompanying drawings. However, the present application is not limited by the embodiments described below. Moreover, when a plurality of embodiments is present, it is also possible to have a combination of embodiments. In the following embodiments, identical constituent elements are referred to by the same reference numerals, and their explanation is not repeated.

Firstly, an explanation is given about a configuration of a drive recorder operation system according to the present application. FIG. 1 is a conceptual diagram for explaining a configuration of the drive recorder operation system according to the present application.

As illustrated in FIG. 1, a drive recorder operation system 100 according to the present application includes a drive recorder 1, a memory medium 2, a sensor unit 3, and a linking device 200. The linking device 200 further includes a server 4 and a terminal device 5.

The drive recorder 1 is installed in a vehicle 90. The drive recorder 1 captures a video of surrounding of the vehicle 90, such as a front side or a rear side of the vehicle 90, in a temporally continuous manner, and records the captured video. Herein, the drive recorder 1 stores the data of the captured video in the memory medium 2.

The memory medium 2 is a storage such as an SD card or a USB memory. The memory medium 2 is detachably attachable to the drive recorder 1 and the terminal device 5. Hence, the data of the video captured by the drive recorder 1 can be moved to the terminal device 5. In the memory medium 2, identification information of the sensor unit 3 is associated in advance. The identification information of the sensor unit 3 is information which can identify the drive recorders installed in the own and other vehicles.

In the present application, the identification information of the sensor unit 3 is stored in a non-rewritable region of the memory medium 2. As a result, the sensor unit 3 and the memory medium 2 are identified in a uniquely manner. Such a configuration can be achieved when, for example, the memory medium 2, in which the identification information of the sensor unit 3 is written in a non-rewritable region, is included in the sensor unit 3.

Figure 2:
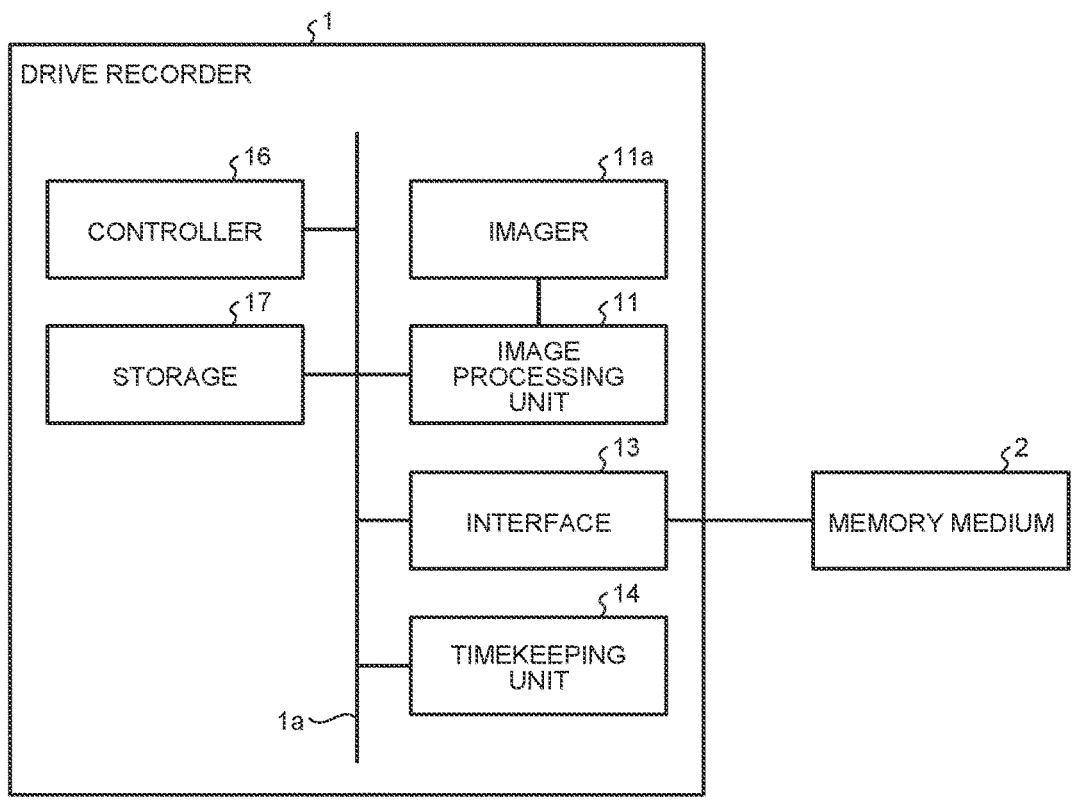
FIG. 2 is a block diagram illustrating an exemplary configuration of a drive recorder according to the present application.

FIG. 2 is a block diagram illustrating an exemplary configuration of the drive recorder according to the present application.

The drive recorder 1 includes an imager 11*a*, a video processor 11, an interface 13, a timekeeping unit 14, a controller 16, and a storage 17. The video processor 11, the interface 13, the timekeeping unit 14, the controller 16, and the storage 17 are connected to each other by a data bus 1*a* in such a way that electrical signals can be sent and received among them.

The imager 11*a* includes, for example, an imaging element such as a CCD, and captures a video of the surrounding of the vehicle 90, such as the front side of the vehicle 90. The imager 11*a* acquires the video in a temporally continuous manner, and sends video signals to the video processor 11.

The video processor 11 performs data compression with respect to the video signals captured by the imager 11*a*, and generates a video file by adding date-time information acquired by the timekeeping unit 14 in real time while capturing the video. The video file generated by the video processor 11 is stored in the memory medium 2 via the interface 13.

The controller 16 is configured by, for example, a CPU. The controller 16 performs various processes in the drive recorder 1 according to a computer program.

The storage 17 is configured by a data storage device such as a random access memory (RAM), a flash memory, or a hard disk storage device. The storage 17 is used to store the computer program to be executed in the controller 16.

Returning to the explanation with reference to FIG. 1, the sensor unit 3 is installed in the vehicle 90 along with the drive recorder 1. The sensor unit 3 detects an event that occurs in the vehicle 90, and sends data of the date and time of the detected event to the server 4.

Figures 3, 4:
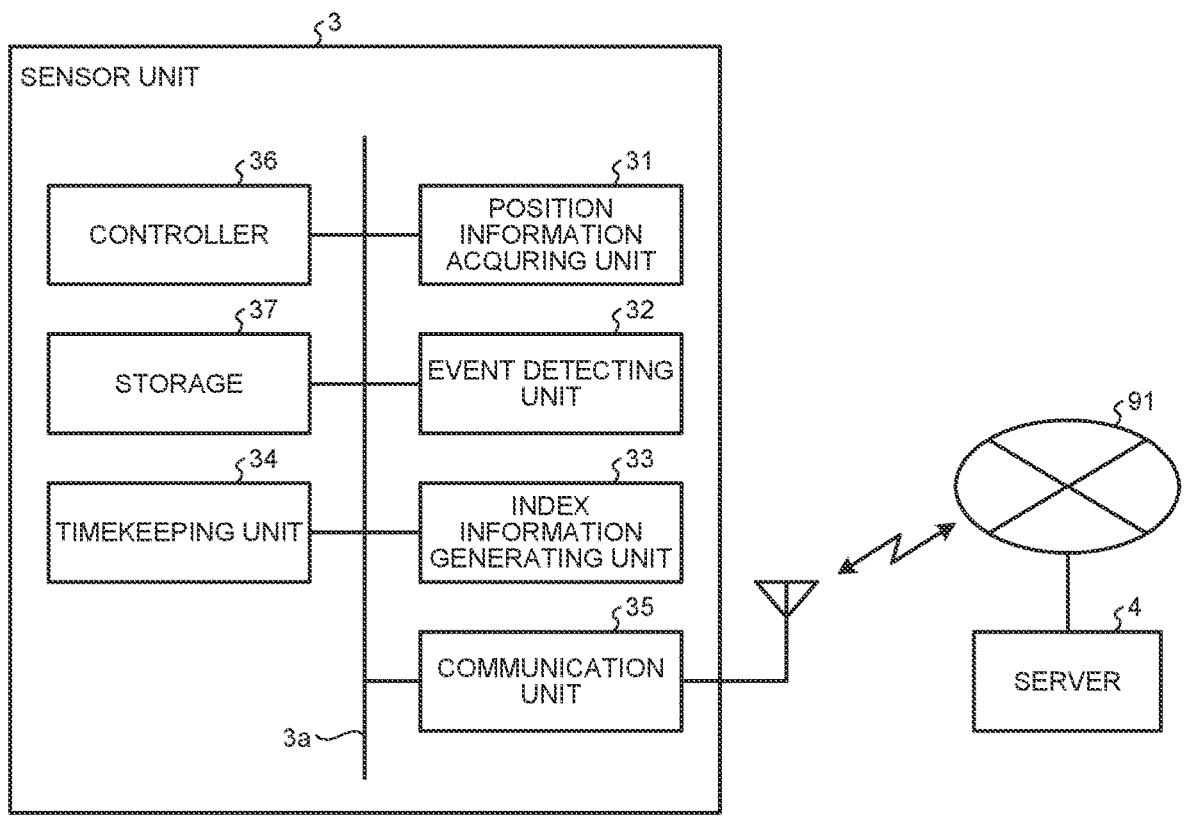
FIG. 3 is a block diagram illustrating an exemplary configuration of a sensor unit according to the present application.
FIG. 4 is a diagram illustrating an example of index information generated by an index information generating unit.

FIG. 3 is a block diagram illustrating an exemplary configuration of the sensor according to the present application.

The sensor unit 3 includes a position information acquiring unit 31, an event detecting unit 32, an index information generating unit 33, a timekeeping unit 34, a communication unit 35, a controller 36, and a storage 37. The position information acquiring unit 31, the event detecting unit 32, the index information generating unit 33, the timekeeping unit 34, the communication unit 35, the controller 36, and the storage 37 are connected to each other by a data bus 3*a* in such a way that electrical signals can be sent and received among them.

The position information acquiring unit 31 receives, for example, GPS signals from GPS satellites and, based on the received GPS signals, acquires a position of the sensor unit 3. In other words, the position information acquiring unit 31 acquires the position information of the vehicle 90 in which the sensor unit 3 is installed.

The event detecting unit 32 detects an event that occurs in the vehicle 90 in which the sensor unit 3 is installed. More particularly, examples of the event detecting unit 32 include an acceleration sensor. In that case, as an event that occurs in the vehicle 90 in which the sensor unit 3 is installed, for example, when an acceleration is equal to or greater than a predetermined value, the event detecting unit 32 detects that the vehicle 90 has received an impact shock due to an accident. However, the event detecting unit 32 is not limited to be an acceleration sensor, and can alternatively be a velocity sensor, a vehicle speed sensor, or a biomedical sensor. Still alternatively, the event detecting unit 32 can be configured using multiple types of sensors.

When the event detecting unit 32 detects the event that occurred in the vehicle 90 in which the sensor unit 3 is installed, the index information generating unit 33 generates index information that contains the date and time of the occurred event and the location of the occurred event.

FIG. 4 is a diagram illustrating an example of the index information generated by the index information generating unit. In the example illustrated in FIG. 4, the index information contains the location of the occurred event, the date of the occurred event, and the time of the occurred event. Position information indicating the location of the occurred event contains, for example, the latitude and the longitude. Date-time information indicating the date and time of the occurred event contains, for example, the year, the month, the day, the hour, the minute, and the second. The position information indicating the location of the occurred event is acquired by the position information acquiring unit 31. The date-time information indicating the date and time of the occurred event is acquired by the timekeeping unit 34. Meanwhile, the index information can also contain, for example, the detected value of the acceleration sensor (the event detecting unit 32).

The index information is associated to the identification information of the sensor unit 3. As a result, the index information and the sensor unit 3 are defined in a uniquely manner.

The communication unit 35 sends, to the server 4 via a communication network 91, the index information generated by the index information generating unit 33. In the present application, the communication unit 35 performs communication compliant to a communication standard such as the LTE network (LTE stands for Long Term Evolution) or the 3G network (3G stands for 3rd Generation).

The controller 36 is configured by, for example, a CPU. The controller 36 performs various processes in the sensor unit 3 according to a computer program.

The storage 37 is configured by a data storage device such as a RAM (Random Access Memory), a flash memory, or a hard disk storage device. The storage 37 is used to store the computer program to be executed in the controller 36.

Figure 5:
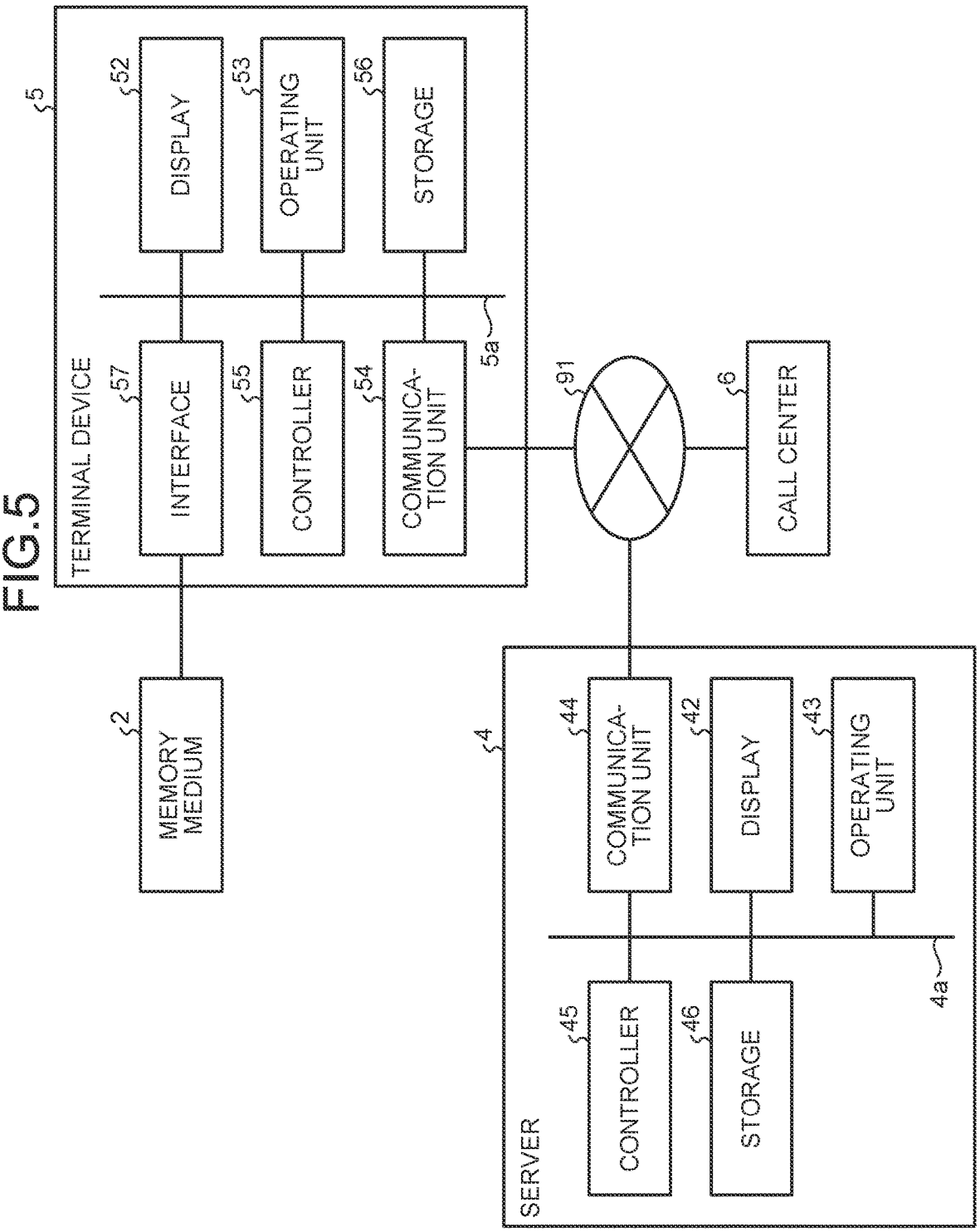
FIG. 5 is a block diagram illustrating an exemplary configuration of a server and a terminal device according to the present application.

FIG. 5 is a block diagram illustrating an exemplary configuration of the server and the terminal device according to the present application.

The server 4 includes a display 42, an operating unit 43, a communication unit 44, a controller 45, and a storage 46. The display 42, the operating unit 43, the communication unit 44, the controller 45, and the storage 46 are connected to each other by a data bus 4a in such a way that electrical signals can be sent and received among them.

The display 42 is configured by a liquid crystal display, an organic EL display (EL stands for Electro Luminescence), or a light emitting diode (LED) display. The display 42 displays operation-related information based on an instruction from the controller 45.

The operating unit 43 is configured by switches such as operation keys, arrow keys, and a touch-sensitive panel, and receives an operation input from a server administrator. The operation input received by the operating unit 43 is then acquired by the controller 45. Other than dealing with the operation input, the operating unit 43 can be configured to also deal with other types of input such as a voice input. The operating unit 43 receives instructions from the server administrator. The operation input from the server administrator corresponds to an instruction by the server administrator.

The communication unit 44 is communicably connected to the communication network 91 in a wireless manner or a wired manner. The communication unit 44 communicates with the sensor unit 3, the terminal device 5, and a call center 6 via the communication network 91.

The controller 45 is configured by, for example, a CPU. The controller 45 performs various processes in the server 4 according to a computer program.

The storage 46 is configured by a data storage device such as a random access memory (RAM), a flash memory, or a hard disk storage device. The storage 46 is used to store the computer program to be executed in the controller 45.

The terminal device 5 includes a display 52, an operating unit 53, a communication unit 54, a controller 55, a storage 56, and an interface 57. The terminal device 5 is an information processing terminal such as a Personal computer (PC) or a smartphone. The display 52, the operating unit 53, the communication unit 54, the controller 55, the storage 56, and the interface 57 are connected to each other by a data bus 5a in such a way that electrical signals can be sent and received among them.

The display 52 is configured by a liquid crystal display, an organic EL display (EL stands for Electro Luminescence), or a light emitting diode (LED) display. The display 52 displays operation-related information based on an instruction from the controller 55.

The operating unit 53 is configured by switches such as operation keys, arrow keys, and a touch-sensitive panel, and receives an operation input from the user. The operation input received by the operating unit 53 is then acquired by the controller 55. Other than dealing with the operation input, the operating unit 53 can be configured to also deal with other types of input such as a voice input. The operating unit 53 receives instructions from the user. The operation input from the user corresponds to an instruction issued by the user.

The communication unit 54 is communicably connected to the communication network 91 in a wireless manner or a wired manner. The communication unit 54 communicates with the server 4 via the communication network 91.

The controller 55 is configured by, for example, a CPU. The controller 55 performs various processes in the terminal device 5 according to a computer program.

The storage 56 is configured by a data storage device such as a random access Memory (RAM), a flash memory, or a hard disk storage device. The storage 56 is used to store the computer program to be executed in the controller 55.

The video file stored in the memory medium 2 is read via the interface 57.

First Embodiment

In a first embodiment of the present application, in the storage 46 of the server 4, a first-type computer program is stored that is meant for transferring the index information, which was sent from the sensor unit 3, to the terminal device 5. According to the first-type computer program, the controller 45 of the server 4 transfers the index information, which was sent from the sensor unit 3, to the terminal device 5 by the communication unit 44 via the communication network 91.

In the first embodiment of the present application, a second-type computer program is stored in the storage 56 of the terminal device 5 for clipping, from the video file stored in the memory medium 2, the video at a time when the event occurred in the vehicle is detected by the sensor unit 3 as a video data, based on the index information, for adding the index information to the clipped video data to generate the event video information, and for sending the event video information to the server 4. According to the second-type computer program, the controller 55 of the terminal device 5 clips, from the video file stored in the memory medium 2, the video at a time when the event occurred in the vehicle is detected by the sensor unit 3 as a video data, based on the index information; adds index information to the clipped video data to generate event video information, and sends the event video information to the server 4.

As a result, the video captured by the drive recorder 1 can be linked to the event that occurred in the vehicle 90.

Moreover, in the first embodiment of the present application, in the storage 46 of the server 4, a third-type computer program is stored that is meant for transferring the event video information, which was sent from the terminal device 5, to the call center 6. According to the third-type computer program, the controller 45 of the server 4 transfers the event video information, which was sent from the terminal device 5, to the call center 6 by the communication unit 44 via the communication network 91.

Figure 6:
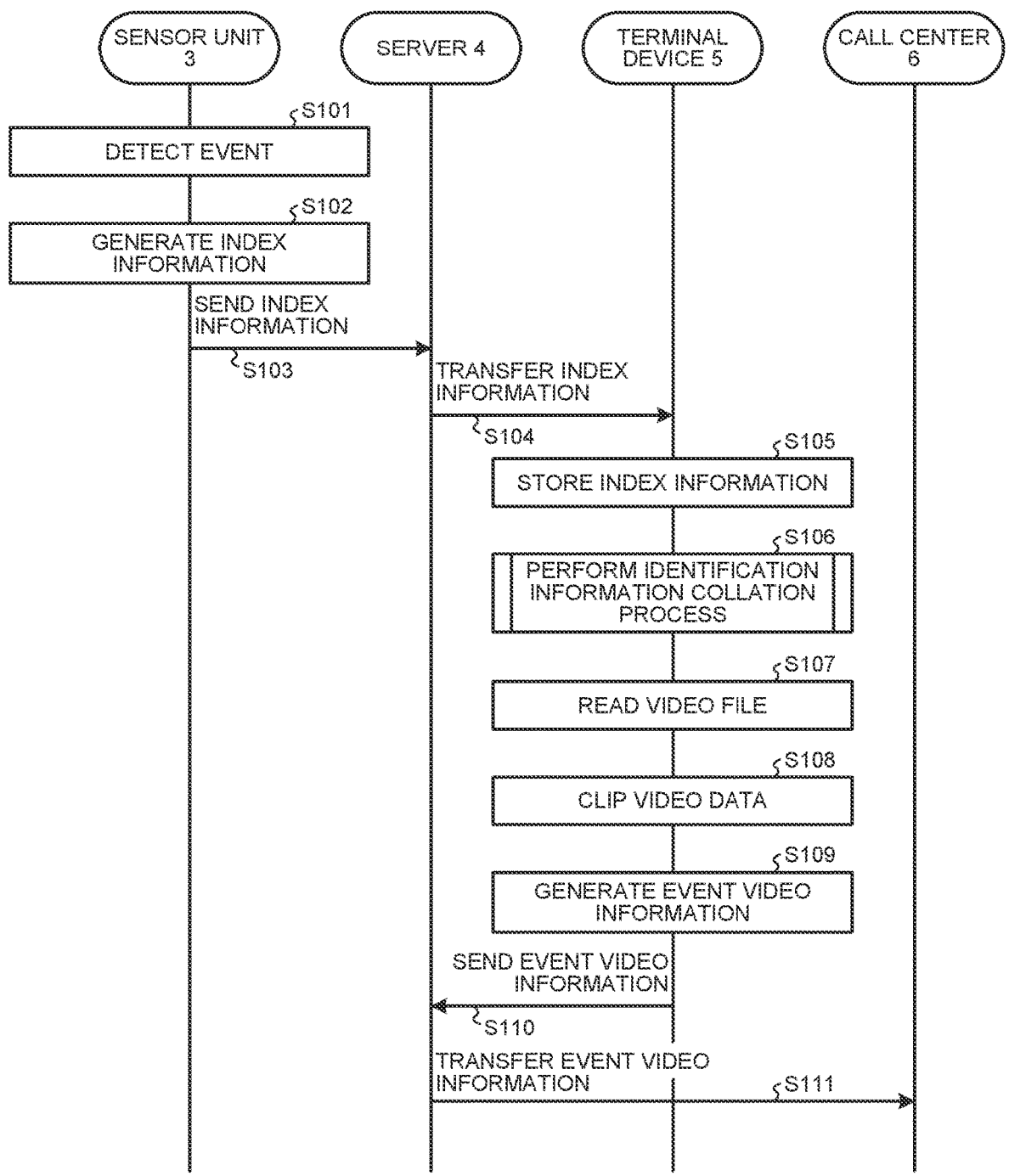
FIG. 6 is a sequence diagram illustrating a specific example of an event video information generation process performed in the drive recorder operation system according to a first embodiment of the present application.

Explained below with reference to FIG. 6 are specific details of an event video information generation process performed in the drive recorder operation system 100 according to the first embodiment of the present application. FIG. 6 is a sequence diagram illustrating a specific example of the event video information generation process performed in the drive recorder operation system according to the first embodiment of the present application. In the event video information generation process illustrated in FIG. 6, the processes are performed by the constituent elements of the sensor unit 3, the server 4, and the terminal device 5. However, the following explanation is given by mainly referring to the sensor unit 3, the server 4, and the terminal device 5.

When an occurrence of an event in the vehicle 90 (for example, an impact shock received by the vehicle 90 due to an accident) is detected (Step S101), the sensor unit 3 generates index information (see FIG. 4) in which the identification information of the sensor unit 3 is associated to the information such as a location and a date and timing of the occurred event (Step S102). Then, the sensor unit 3 sends the generated index information to the server 4 (Step S103).

Upon receiving the index information from the sensor unit 3, the server 4 transfers the index information to the terminal device 5 (Step S104).

The index information transferred from the server 4 to the terminal device 5 can be stored in, for example, a dedicated file recognizable by the second-type computer program in the terminal device 5, and can be automatically sent to an email address of the user.

The index information received by the terminal device 5 is stored in the storage 56 thereof (Step S105).

As explained above, in the memory medium 2, the identification information of the sensor unit 3 is associated in advance. Moreover, when the index information is generated in the sensor unit 3, the identification information of the sensor unit 3 is associated to the index information. Based on the identification information, the video file and the index information stored in the memory medium 2 are identified in a uniquely manner.

Figure 7:
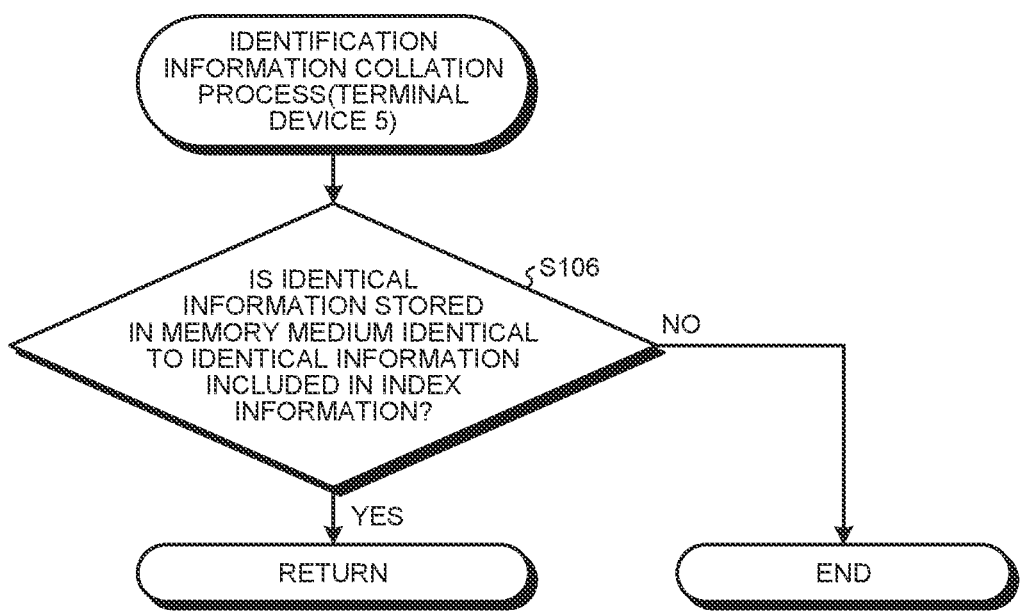
FIG. 7 is a flowchart for explaining a specific example of an identification information collation process performed in the drive recorder operation system according to the first embodiment of the present application.

The terminal device 5 performs an identification information collation process illustrated in FIG. 7. FIG. 7 is a flowchart for explaining a specific example of the identification information collation process performed in the drive recorder operation system according to the first embodiment of the present application. Regarding the identification information collation process illustrated in FIG. 7, an explanation is given by mainly referring to the terminal device 5.

The terminal device 5 performs collation to determine whether or not the identification information stored in the memory medium 2 which is connected to the interface 57 is identical to the identification information included in the index information received from the server 4 (Step S106).

If the identical information is not identical (No at Step S106), then the system control does not proceed to Step S107 illustrated in FIG. 6, and the event video information generation process is ended.

On the other hand, if the identification information is identical (Yes at Step S106), then the system control proceeds to Step S107 illustrated in FIG. 6. Then, the terminal device 5 reads the video file stored in the memory medium 2 (Step S107).

Subsequently, based on the index information, the terminal device 5 clips, from the read video file, the video at a time when the event occurred in the vehicle is detected by the sensor unit 3 as a video data (Step S108), and adds the index information, which is stored in the storage 56, to the clipped video data to generate the event video information (Step S109).

More particularly, for example, the user boots the terminal device 5 and operates the operating unit 53 to open the dedicated file in which the index information is stored. As a result, the second-type computer program is started, and it reads the video file from the memory medium 2 and edits the video. Then, from the read video file, the terminal device 5 clips the video data for a predetermined period of time (for example, 15 seconds to 30 seconds) that includes the date and time of the occurred event included in the index information, and generates the event video information that contains the date-time information, the position information, and a detected value of the acceleration sensor (the event detecting unit 32) included in the index information.

As a result, the event video information is acquired in which the video captured by the drive recorder 1 is linked to the event that occurred in the vehicle 90.

Then, the terminal device 5 sends the event video information to the server 4 (Step S110).

Upon receiving the event video information from the terminal device 5, the server 4 transfers it to the call center 6 (Step S111).

Second Embodiment

In a second embodiment according to the present application, in the storage 46 of the server 4, the first-type computer program is stored that is meant for transferring the index information, which was sent from the sensor unit 3, to the terminal device 5. According to the first-type computer program, the controller 45 of the server 4 transfers the index information, which was sent from the sensor unit 3, to the terminal device 5 by the communication unit 44 via the communication network 91.

In the second embodiment of the present application, the second-type computer program is stored in the storage 56 of the terminal device 5 for clipping, from the video file stored in the memory medium 2, the video at a time when the event occurred in the vehicle is detected by the sensor unit 3 as a video data, based on the index information, and sending the clipped video data to the server 4. According to the second-type computer program, the controller 55 of the terminal device 5 clips, from the video file stored in the memory medium 2, the video at a time when the event occurred in the vehicle is detected by the sensor unit 3 as a video data, based on the index information, and sends the clipped video data to the server 4 by the communication unit 54 via the communication network 91.

Moreover, in the second embodiment of the second present application, the third-type computer program is stored in the storage 46 of the server 4 for generating the event video information by adding the index information to the video data sent from the terminal device 5, and sending the event video information to the call center 6. According to the third-type computer program, the controller 45 of the server 4 generates the event video information by adding the index information to the video data sent from the terminal device 5, and sends the event video information to the call center 6 by the communication unit 44 via the communication network 91.

As a result, the video captured by the drive recorder 1 can be linked to the event that occurred in the vehicle 90.

Figure 8:
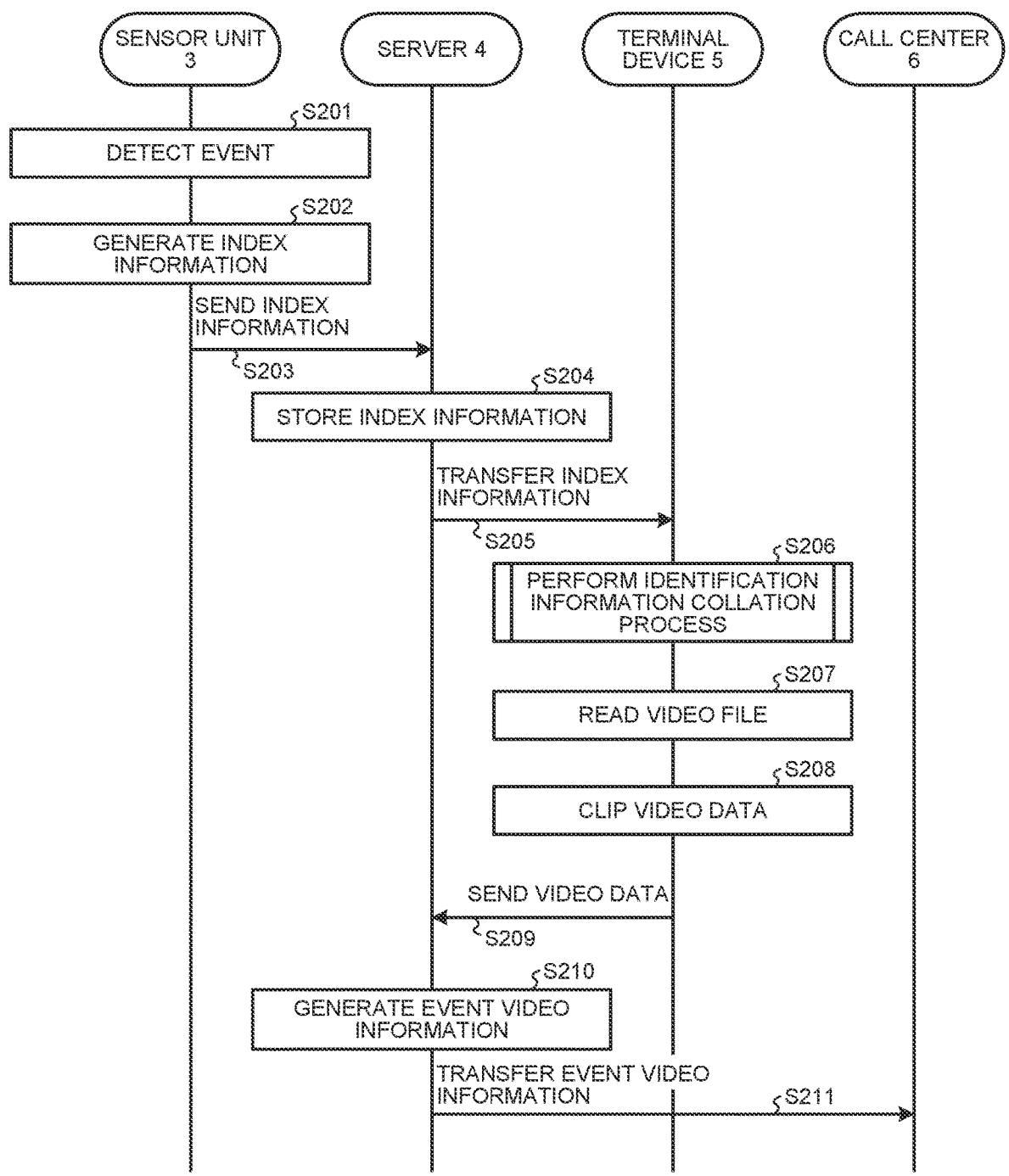
FIG. 8 is a sequence diagram illustrating a specific example of an event video information generation process performed in the drive recorder operation system according to a second embodiment of the present application.

Explained below with reference to FIG. 8 are specific details of an event video information generation process performed in the drive recorder operation system 100 according to the second embodiment of the present application. FIG. 8 is a sequence diagram illustrating a specific example of the event video information generation process performed in the drive recorder operation system according to the second embodiment of the present application. In the event video information generation process illustrated in FIG. 8, the processes are performed by the constituent elements of the sensor unit 3, the server 4, and the terminal device 5. However, the following explanation is given by mainly referring to the sensor unit 3, the server 4, and the terminal device 5.

When an occurrence of an event in the vehicle 90 (for example, an impact shock received by the vehicle 90 due to an accident) is detected (Step S201), the sensor unit 3 generates the index information (see FIG. 4) in which the identification information of the sensor unit 3 is associated to the information such as the location and the date and time of the occurred event (Step S202). Then, the sensor unit 3 sends the generated index information to the server 4 (Step S203).

The index information received by the server 4 is stored in the storage 46 thereof (Step S204). Then, the server 4 transfers the index information to the terminal device 5 (Step S205).

The index information transferred from the server 4 to the terminal device 5 can be stored in, for example, a dedicated file that is recognizable by the second-type computer program in the terminal device 5, and can be automatically sent to an email address of the user.

The terminal device 5 performs collation to determine whether or not the identification information stored in the memory medium 2, which is connected to the interface 57, is identical to the identification information included in the index information received from the server 4 (Step S206). The identification information collation process is identical to the identification information collation process according to the first embodiment (Step S106). Hence, that explanation is not given again.

If the identification information is identical (Yes at Step S106 in FIG. 7), then the system control proceeds to Step S207 illustrated in FIG. 8. Then, the terminal device 5 reads the video file, which is stored in the memory medium 2, via the interface 57 (Step S207).

Then, the terminal device 5 clips, from the read video file, the video at a time when the event occurred in the vehicle is detected by the sensor unit 3 as a video data, based on the index information (Step S208), and sends the clipped video data to the server 4 (Step S209).

More particularly, for example, the user boots the terminal device 5 and operates the operating unit 53 to open the dedicated file in which the index information is stored. As a result, the second-type computer program is started, and it reads the video file from the memory medium 2 and edits the video. Then, from the read video file, the terminal device 5 clips the video data for a predetermined period of time (for example, 15 seconds to 30 seconds) that includes the date and time of the occurred event included in the index information, and sends the clipped video data to the server 4.

Upon receiving the video data from the terminal device 5, the server 4 generates the event video information by adding, to the received video data, the index information stored in the storage 46 (more particularly, for example, the date-time information, the position information, and the detected value of the acceleration sensor (the event detecting unit 32)) to generate the event video information (Step S210).

As a result, the event video information is acquired in which the video captured by the drive recorder 1 is linked to the event that occurred in the vehicle 90.

Then, the server 4 transfers the generated event video information to the call center 6 (Step S211).

Third Embodiment

In a third embodiment of the present application, in the storage 56 of the terminal device 5, the second-type computer program is stored or clipping, from the video file stored in the memory medium 2, the video at a time when the event occurred in the vehicle is detected by the sensor unit 3 as a video data, based on the index information, for adding the index information to the clipped video data to generate the event video information, and for sending the event video information to the server 4. According to the second-type computer program, the controller 55 of the terminal device 5 clips, from the video file stored in the memory medium 2, the video at a time when the event occurred in the vehicle is detected by the sensor unit 3 as a video data, based on the index information, adds the index information to the clipped video data to generate the event video information, and sends the event video information to the server 4 by the communication unit 54 via the communication network 91.

As a result, the video captured by the drive recorder 1 can be linked to the event that occurred in the vehicle 90.

Figure 9:
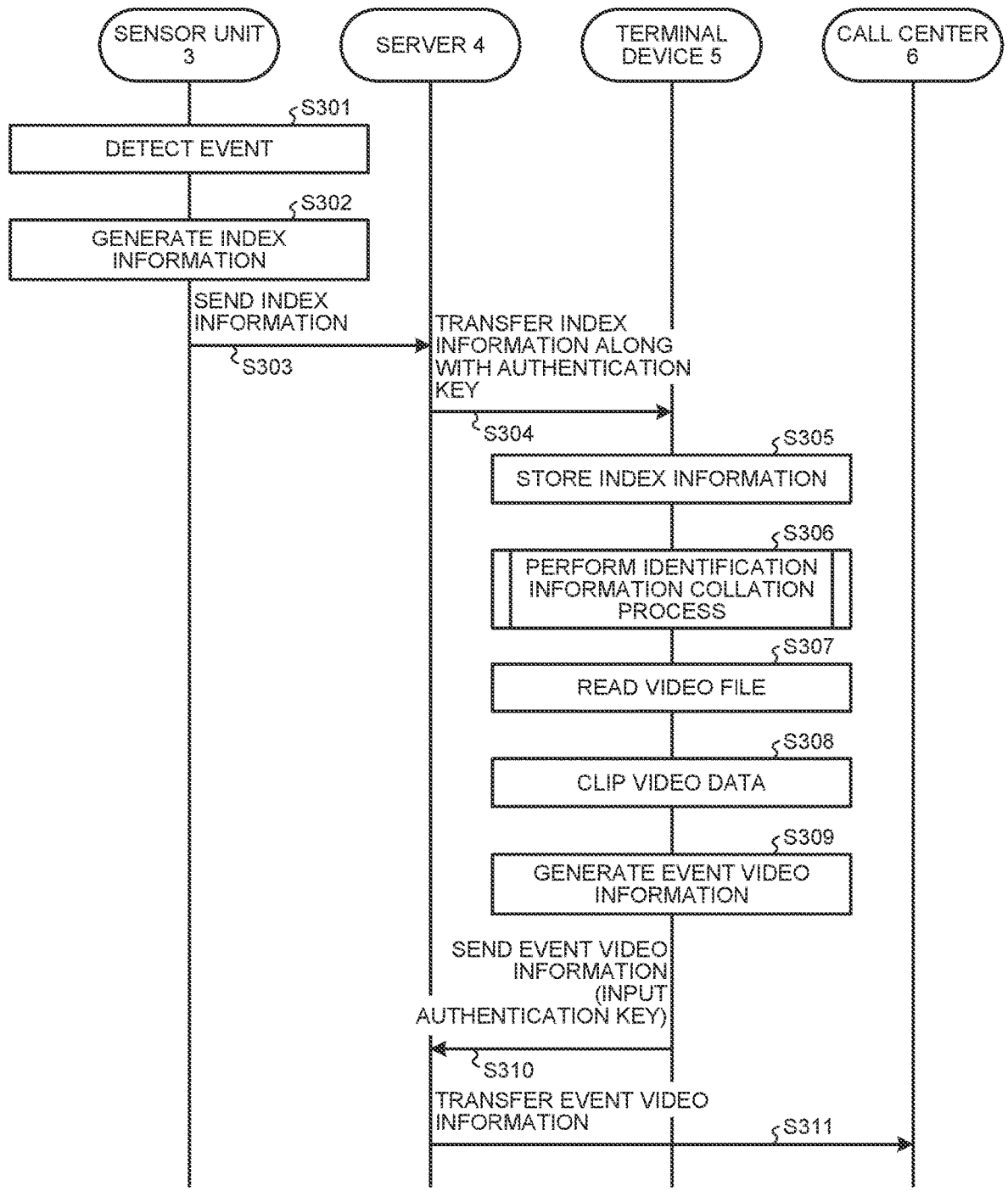
FIG. 9 is a sequence diagram illustrating a specific example of an event video information generation process performed in the drive recorder operation system according to a third embodiment of the present application.
Figure 10:
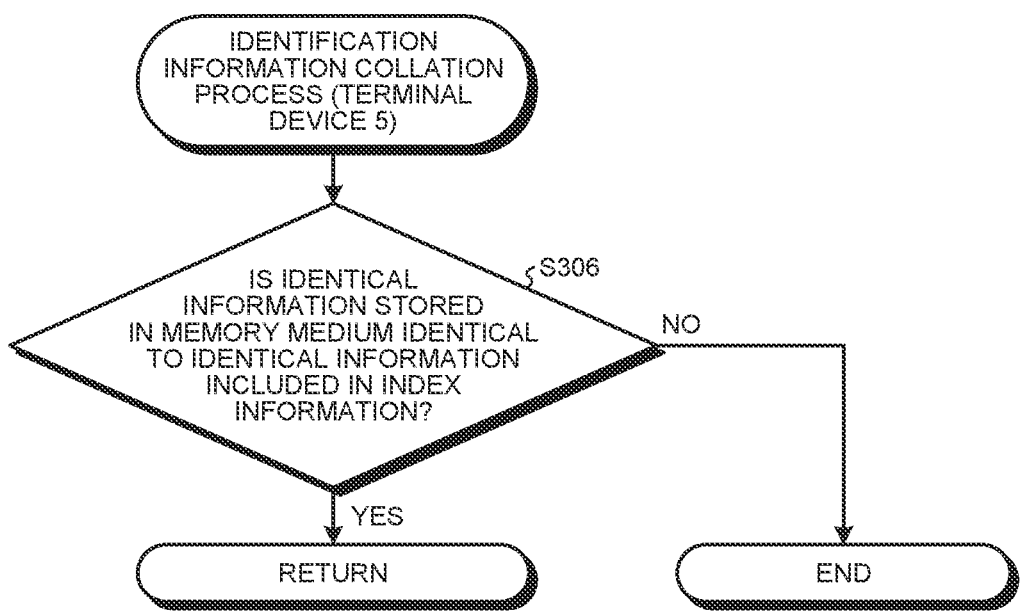
FIG. 10 is a flowchart for explaining a specific example of an identification information collation process performed in the drive recorder operation system according to the third embodiment of the present application.

Explained below with reference to FIG. 9 are specific details of an event video information generation process performed in the drive recorder operation system 100 according to the third embodiment of the present application. FIG. 9 is a sequence diagram illustrating a specific example of the event video information generation process performed in the drive recorder operation system according to the third embodiment of the present application. FIG. 10 is a flowchart for explaining a specific example of the identification information collation process performed in the drive recorder operation system according to the third embodiment of the present application. The following explanation is given about the processes (S304, S310) that are different from the processes in the first embodiment, and the explanation of the processes (S301 to S303, S305 to S309, S311) that are identical to the processes in the first embodiment are omitted.

In the third embodiment, when the index information is received from the sensor unit 3, the server 4 transfers the received index information along with an authentication key to the terminal device 5 (Step S304).

The index information and the authentication key transferred from the server 4 to the terminal device 5 at Step S304 can be stored in, for example, a dedicated file recognizable by the second-type computer program in the terminal device 5, and can be automatically sent to an email address of the user.

At Step S310, at the time of sending the event video information to the server 4, the terminal device 5 requests for inputting the authentication key, which was sent along with the index information from the server 4 at Step S304. When the user inputs the correct authentication key, the event video information is delivered to the server 4.

In the present application, as explained above, the identification information of the sensor unit 3 is stored in a non-rewritable region of the memory medium 2. For that reason, the index information associated to the identification information of the sensor unit 3 and the video file stored in the memory medium 2 are identified in a uniquely manner. That can prevent falsification of the data, and can increase reliability of the generated event video information.

Moreover, in the third embodiment, since the input of the authentication key is requested at the time of sending the event video information from the terminal device 5 to the server 4 at Step S310, it becomes possible to enhance a security level of the event video information transferred to the call center 6.

Fourth Embodiment

Figure 11:
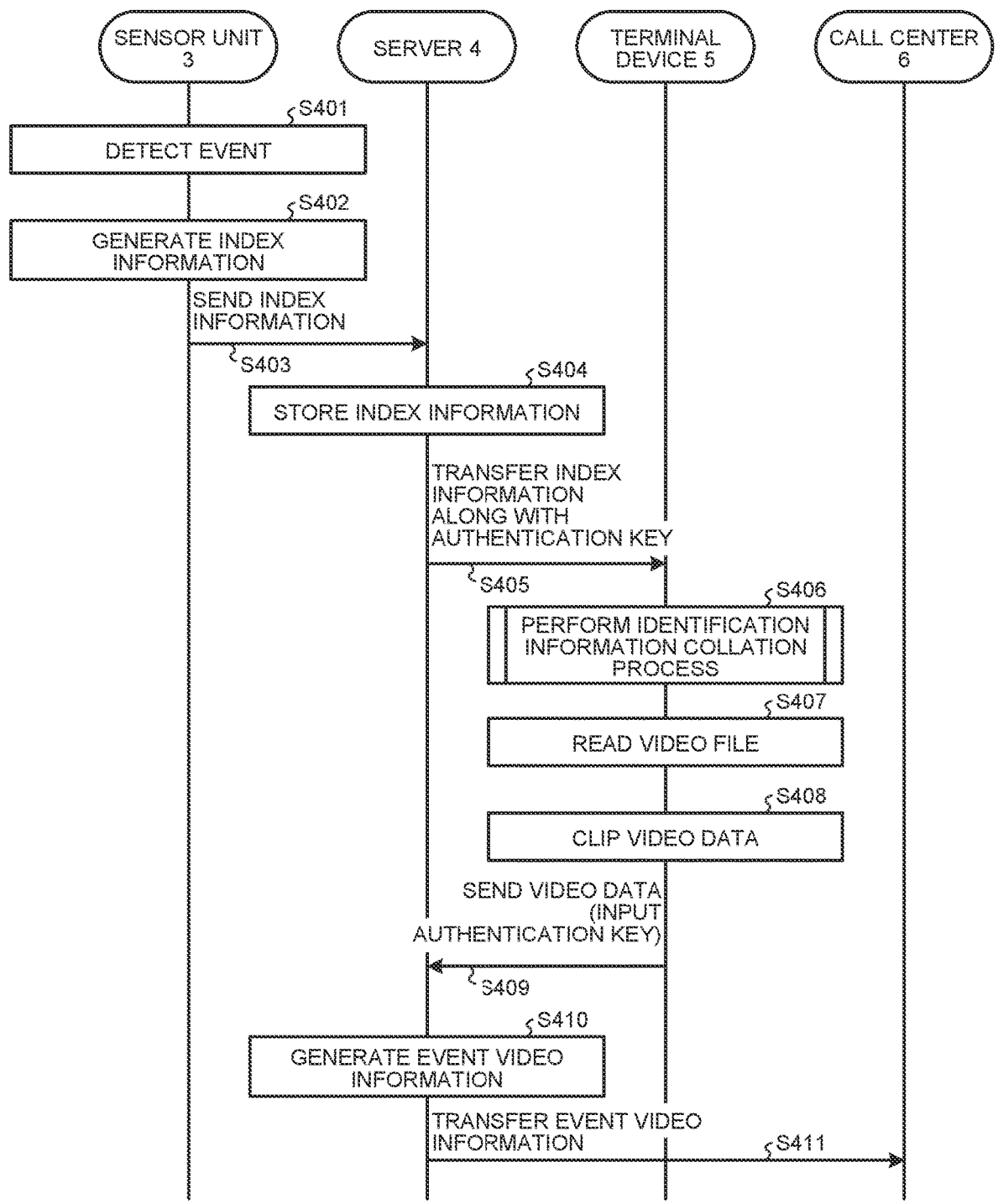
FIG. 11 is a sequence diagram illustrating a specific example of an event video information generation process performed in the drive recorder operation system according to a fourth embodiment of the present application.

Explained below with reference to FIG. 11 are specific details of an event video information generation process performed in the drive recorder operation system 100 according to a fourth embodiment of the present application. FIG. 11 is a sequence diagram illustrating a specific example of the event video information generation process performed in the drive recorder operation system according to the fourth embodiment of the present application. The following explanation is given about the processes (S405, S409) that are different from the processes in the second embodiment, and the explanation of the processes (S401 to S404, S406 to S408, S410, S411) that are identical to the processes in the first embodiment are omitted.

In the fourth embodiment, the server 4 transfers the received index information along with an authentication key to the terminal device (Step S405).

The index information and the authentication key transferred from the server 4 to the terminal device 5 at Step S405 can be stored in, for example, a dedicated file recognizable by the second-type computer program in the terminal device 5, and can be automatically sent to an email address of the user.

Moreover, in the fourth embodiment, at the time of sending the event video information to the server 4, the terminal device 5 requests for inputting the authentication key, which was sent along with the index information from the server 4 at Step S405. When the user inputs the correct authentication key, the event video information is delivered to the server 4.

In the present application, as explained above, the identification information of the sensor unit 3 is stored in a non-rewritable region of the memory medium 2. For that reason, the index information associated to the identification information of the sensor unit 3 and the video file stored in the memory medium 2 are identified in a uniquely manner. That can prevent falsification of the data, and can increase reliability of the generated event video information.

Moreover, in the fourth embodiment, since the input of the authentication key is requested at the time of sending the event video information from the terminal device 5 to the server 4 at Step S409, it becomes possible to enhance the security level of the event video information transferred to the server 4, and it becomes possible to enhance the security level of the event video information transferred to the call center 6.

In the first to fourth embodiments described above, the linking device 200 is configured by the server 4 and the terminal device 5. Alternatively, the linking device 200 can be configured by only a single device. In that case, the linking device 200 may be an embodiment that reads the video file from the memory medium 2, that clips, the video at a time when the event occurred in the vehicle is detected by the sensor unit 3 as a video data, based on the index information, that adds the index information to the clipped video data to generate the event video information, and that sends the event video information to the call center 6.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

According to the embodiments, it becomes possible to link a video captured by a drive recorder to an event that occurred in the vehicle.

What is claimed is:

1. A drive recorder operation system comprising:
    a sensor unit configured to send index information containing information about an event which occurred in a vehicle;
    a drive recorder configured to capture a video of a surrounding of the vehicle in a temporally continuous manner and store the video as a video file in a memory medium; and
    a linking device configured to link the event which occurred in the vehicle to the video file stored in the memory medium based on the index information sent from the sensor unit, wherein
    the linking device comprises:
        a server configured to transfer the index information sent from the sensor unit; and
        a terminal device comprising a processor and configured to read the video file from the memory medium, clip video data for a predetermined period of time including a date and time at which the event occurred based on the index information transferred from the server to yield clipped video data, generate event video information in which the index information is added to the clipped video data, and send the clipped video data to the server,
    the sensor unit is further configured to send identification information of the sensor unit along with the index information,
    the linkage device is further configured to, in response to determining that the identification information of the index information sent from the sensor unit is identical to the identification information stored in a non-rewritable region in the memory medium, link the event which occurred in the vehicle to the video file stored in the memory medium based on the index information,
    the server is further configured to transfer the index information sent from the sensor unit along with an authentication key, and
    the terminal device is further configured to send, when the authentication key is input, the event video information to the server.

2. The drive recorder operation system according to claim 1, wherein
    the sensor unit is further configured to include an acceleration sensor that detects an impact shock received by the vehicle as the event, and
    the index information further contains date-time information indicating a date and a time when a detected value of the acceleration sensor becomes equal to or greater than a predetermined value.

3. The drive recorder operation system according to claim 2, wherein
    the linking device is further configured to add the date-time information to the clipped video data to generate the event video information.

4. The drive recorder operation system according to claim 2, wherein
    the terminal device is further configured to add the index information to the video data clipped for the predetermined period of time to generate the event video information.

5. The drive recorder operation system according to claim 2, wherein
    the server is further configured to add the index information to the video data sent from the terminal device to generate the event video information.

6. The drive recorder operation system according to claim 1, wherein
    the sensor unit is further configured to include a position information acquiring unit configured to acquire position information of the vehicle, and
    the index information further contains the position information at the time at which the event occurred.

* * * * *